Patented Nov. 2, 1943

2,333,581

UNITED STATES PATENT OFFICE 2,333,581

REACTION OF EPINEPHRINE WITH STEROLS AND PRODUCT THEREOF

Richard G. Roberts, Chicago, Ill., assignor to Armour and Company, Chicago, Ill., a corporation of Illinois No Drawing. Application October 3, 1941, Serial No. 413,567

5 Claims. (Cl. 260—397.2)

This invention is concerned with the preparation of new and valuable compounds which can be characterized as addition compounds or "conjugates" of epinephrine with sterols.

It has been observed that blood pressure increases are obtained in experimental animals after they have been injected with epinephrine but the effects are relatively transitory. For example, in dogs this elevation has been observed to last only about ten minutes. It has also been a recognized practice to treat patients allergic to various substances with epinephrine or epinephrine hydrochloride. In these instances, also, it has been a disadvantage that the effect of the epinephrine or epinephrine hydrochloride has not been of sufficient duration and the patients have required frequent and costly treatment.

Various workers have attempted to produce substances which would prolong the action of epinephrine without concomitant ill effects on the patient. For example, it has been proposed to produce a "slow epinephrine" by suspending epinephrine base in olive or peanut oil and it was found that subcutaneous injections of this composition gave a much prolonged relief from asthmatic symptoms. However, these oil depots are not well tolerated by some subjects and may remain in the patient for from two to three weeks.

I have set myself to the problem of so modifying epinephrine that its action is greatly prolonged, thus rendering it unnecessary to prescribe repeated injections in order to maintain the effect of the epinephrine on the human system. It is a further object of my invention to provide epinephrine compounds which can be used for subcutaneous injection with such vehicles as glycols, glycerols or triacetin, which substances are not as irritating as vegetable oils.

And I have discovered that epinephrine will combine with sterols to form addition products. The exact constitution of such addition products is not clear, but I conceive of them as molecular addition products containing both epinephrine and the sterol. These products may be somewhat analogous to the formation of organic salts, such as amine hydrochlorides, but I do not wish to be bound to any particular theory with respect to the formation of my product. One convenient way of referring to them is by defining them as conjugates. For example, I find that a molecule of epinephrine will combine with a molecule of a sterol.

The most important advantage inherent in my products is the fact that the effect of administration is greatly prolonged. For example, dogs injected intravenously with the compounds of the present invention show an increase in blood pressure which lasts for as long as three hours. The same quantity of pure epinephrine base produces an effect lasting for only ten minutes.

Similarly in treating subjects suffering from asthma, it has been found possible to produce relief from symptoms for from twelve to eighteen hours by a single subcutaneous injection of compounds with which this invention is concerned. On the other hand, individuals who have been treated with epinephrine hydrochloride have required as many as three to six injections per day and as many as four per night.

The products which are the subject of this invention are prepared by mixing suitable proportions of epinephrine and sterol compounds or a mixture of sterols together in a suitable solvent, as, for example, anhydrous liquid ammonia or methyl amine or ethylamine. Upon completion of the reaction the solvent is allowed to boil off, the last traces being removed, if desired, by vacuum.

Following are examples showing how these compounds may be prepared:

*Example 1*

211 mgms. of cholesterol were mixed with 100 mgms. of epinephrine and reacted in liquid ammonia. The product is a whitish, amorphous powder slightly soluble in liquid ammonia and easily dispersed in ethylene glycol.

*Example 2*

218 mgms. of agnosterol were mixed with 100 mgms. of epinephrine and reacted in liquid ammonia. The product is a whitish amorphous powder slightly soluble in liquid ammonia and easily dispersed in ethylene glycol.

*Example 3*

211 mgms. of coprosterol were mixed with 100 mgms. of epinephrine and reacted in liquid ammonia. The product is a whitish amorphous powder slightly soluble in liquid ammonia and easily dispersed in ethylene glycol.

*Example 4*

218 mgms. of ergosterol were mixed with 100 mgms. of epinephrine and reacted in liquid ammonia. The product is a whitish amorphous powder slightly soluble in liquid ammonia and easily dispersed in ethylene glycol.

*Example 5*

234 mgms. of lanosterol were mixed with 100 mgms. of epinephrine and reacted in liquid ammonia. The product is a whitish amorphous powder slightly soluble in liquid ammonia and easily dispersed in ethylene glycol.

*Example 6*

234 mgms. of sitosterol were mixed with 100 mgms. of epinephrine and reacted in liquid ammonia. The product is a whitish amorphous powder slightly soluble in liquid ammonia and easily dispersed in ethylene glycol.

*Example 7*

226 mgms. of stigmasterol were mixed with 100 mgms. of epinephrine and reacted in liquid ammonia. The product is a whitish amorphous powder slightly soluble in liquid ammonia and easily dispersed in ethylene glycol.

The reactions are suitably carried out at temperatures at which the solvents used are liquid, for example, at −33.5° C. in liquid ammonia or at −6.5° C. in methylamine. The reaction is conveniently carried out at ordinary pressures, but the pressure may be elevated or reduced.

The relative proportions of epinephrine and its conjugate-forming sterol constituent can be varied over wide limits. I generally use equimolecular equivalents so that about one mol of epinephrine reacts with about one mol of the sterol compound. But these quantities need not be restricted. An excess of epinephrine does no harm since in that case the final product is composed of a mixture of epinephrine and the epinephrine-sterol conjugate. The presence of the epinephrine conjugate prolongs the effect of the epinephrine and I can, in consequence, deliberately prepare mixtures of epinephrine base, or epinephrine hydrochloride, together with an epinephrine-sterol addition product.

The products obtained according to this invention may be dissolved or dispersed in ethylene glycol, propylene glycol, glycerol or glycerine triacetate (triacetin) for injection purposes. A marked advantage of these products is that they can also be given intravenously by a very slow injection of the diluted conjugate, avoiding the production of extremely high blood pressure as would result from the use of epinephrine, yet obtaining a prolonged effect since the conjugate is not as rapidly oxidized and destroyed in the blood stream as epinephrine would be. In other words, these conjugates resemble the vegetable alkaloid ephedrin somewhat but do not cause nausea, vomiting, etc., as does ephedrin.

Furthermore, it has been observed that these conjugates maintain a stronger heartbeat than epinephrine and do not have a depressor action following the pressor action. These phenomena are as desirable therapeutically as the prolongation of the pressor action.

This invention is a continuation in part of my application, Serial No. 255,492, filed February 9, 1939.

Having thus described my invention, what I claim is:

1. A conjugate of epinephrine and a sterol.
2. A conjugate of epinephrine and cholesterol.
3. A conjugate of epinephrine and agnosterol.
4. A conjugate of ergosterol and epinephrine.
5. The process of preparing an epinephrine addition product which comprises admixing epinephrine and a sterol with a non-aqueous, low-boiling solvent chosen from the group consisting of liquid ammonia, methylamine and ethylamine, allowing reaction to occur in said solvent, and recovering the reaction product therefrom.

RICHARD G. ROBERTS.